(12) United States Patent
Duchaine

(10) Patent No.: US 8,807,933 B2
(45) Date of Patent: Aug. 19, 2014

(54) METHOD FOR MANUFACTURING A RECTIFIER

(75) Inventor: Georges Duchaine, Warsage (BE)

(73) Assignee: Techspace Aero S.A., Milmort (BE)

( * ) Notice: Subject to any disclaimer, the term of this patent is extended or adjusted under 35 U.S.C. 154(b) by 709 days.

(21) Appl. No.: 13/075,801

(22) Filed: Mar. 30, 2011

(65) Prior Publication Data

US 2011/0243752 A1   Oct. 6, 2011

(30) Foreign Application Priority Data

Apr. 2, 2010   (EP) .................................... 10159064

(51) Int. Cl.
| | | |
|---|---|---|
| *F01D 9/00* | (2006.01) | |
| *B29C 70/86* | (2006.01) | |
| *B29C 53/58* | (2006.01) | |
| *B29C 70/48* | (2006.01) | |
| *F01D 9/04* | (2006.01) | |
| *B29C 70/32* | (2006.01) | |
| *B29C 65/00* | (2006.01) | |
| *B29C 65/02* | (2006.01) | |
| *B29K 63/00* | (2006.01) | |

(52) U.S. Cl.
CPC .................. *B29C 70/48* (2013.01); *B29C 70/86* (2013.01); *B29C 66/721* (2013.01); *B29C 53/587* (2013.01); *F05D 2230/2322* (2013.01); *B29C 65/02* (2013.01); *F01D 9/044* (2013.01); *F05D 2300/614* (2013.01); *B29C 66/73751* (2013.01); *B29C 66/723* (2013.01); *B29C 66/7392* (2013.01); *B29C 70/32* (2013.01); *B29K 2063/00* (2013.01); *F05D 2300/603* (2013.01); *B29C 66/7394* (2013.01); *F05D 2300/44* (2013.01); *B29C 70/865* (2013.01); *F01D 9/04* (2013.01); *B29C 66/474* (2013.01)
USPC ..................................... 415/209.3; 29/889.22

(58) Field of Classification Search
USPC .......... 416/223 R, 229 R, 230, 229 A, 241 R, 416/241 B; 29/889.21, 889.2, 419.1, 527.2
See application file for complete search history.

(56) References Cited

U.S. PATENT DOCUMENTS 2,995,294 A * 8/1961 Warnken .................... 415/209.2
5,820,338 A   10/1998 Kasprow et al.

(Continued)

FOREIGN PATENT DOCUMENTS

| | | |
|---|---|---|
| DE | 102006062414 A1 | 6/2008 |
| EP | 1936121 A1 | 6/2008 |
| EP | 2204547 A1 | 7/2010 |

(Continued)

*Primary Examiner* — Edward Look
*Assistant Examiner* — Christopher J Hargitt
(74) *Attorney, Agent, or Firm* — Reinhart Boerner Van Deuren P.C.

(57) ABSTRACT

The present invention relates to a method for manufacturing a turbine-engine composite rectifier comprising a ferrule provided with a plurality of stator vanes (2), said stator vanes each comprising a blade (4) and optionally a platform (3), said method comprising at least the following steps:
a) first layers of a reinforcement (6) are wound on a mandrel, said mandrel also acting as a mold and comprising protruding portions, said first reinforcement layers (6) comprising buttonholes (7) positioned facing the protruding portions;
b) a prefabricated disc (9) is positioned on each of the protruding portions:
c) last reinforcement layers (8) are wound above the discs (9), thereby forming a preform;
d) a resin is injected into the closed mold with the preform and the resin-impregnated preform is polymerized;
e) the polymerized preform is taken out of the mold and the base of the blade (4) or optionally the platform of the vane (3), if the latter comprises one of them, is added by welding on each of the discs (9).

19 Claims, 3 Drawing Sheets

(56) References Cited

U.S. PATENT DOCUMENTS

| | | | |
|---|---|---|---|
| 5,957,658 A | 9/1999 | Kasprow et al. | |
| 6,196,794 B1 * | 3/2001 | Matsumoto | 415/191 |
| 6,543,995 B1 | 4/2003 | Honda et al. | |
| 2008/0206049 A1 | 8/2008 | Depaepe et al. | |
| 2009/0317246 A1 | 12/2009 | Lutz et al. | |
| 2011/0033285 A1 | 2/2011 | Turi et al. | |

FOREIGN PATENT DOCUMENTS

| | | |
|---|---|---|
| FR | 2675537 A1 | 10/1992 |
| JP | 10325303 A | 12/1998 |
| WO | WO 2008/000014 A2 | 1/2008 |

* cited by examiner

METHOD FOR MANUFACTURING A RECTIFIER

FIELD OF THE INVENTION

The present invention relates to a method for manufacturing a rectifier for a turbine engine.

It more particularly relates to a method for manufacturing composite inner or outer ferrules with integrated or added vanes.

It also relates to the rectifier obtained according to the method.

STATE OF THE ART

Axial compressors are well known per se and are used i.a. in turbine engines.

These low or high pressure compressors comprise several stages of rotating vanes that are separated by rectifier stages which have the purpose of repositioning the velocity vector of the fluid exiting the previous stage before sending it to the next stage.

These rectifier stages essentially comprise fixed vanes, further called stator vanes, connecting an outer ferrule to an inner ferrule, both being concentric and delimiting the airflow area or aerodynamic vein.

Stator vanes generally comprise a platform that is attached to the outer ferrule by riveting, welding, bolting, adhesive bonding, etc. Examples of assembling with rivets (U.S. Pat. No. 6,543,995 A) and bolts (EP 1 936 121 A) are illustrated in FIGS. 1a and 1b, respectively (cf. caption).

Assembling with rivets, bolts, etc. has the drawback of requiring that apertures be pierced in the ferrule in order to let through attachment elements, which causes a reduction in the structural strength of the ferrule.

Assembling by adhesive bonding has the disadvantage of not allowing its use as the only assembling method but always as an addition to another assembling method, for example with screws, and this in order to ensure better mechanical performance.

AIMS OF THE INVENTION

The present invention aims to provide a solution which allows to overcome the drawbacks of the state of the art.

The present invention aims in particular to produce an assembly between vanes and ferrules that does not weaken the mechanical strength of the ferrule.

The present invention further aims to produce an assembly between vanes and ferrules allowing the vanes to be easily repaired in the event of breakage.

SUMMARY OF THE INVENTION

The present invention relates to a method for manufacturing a composite rectifier for a turbine engine comprising a ferrule provided with a plurality of stator vanes, said stator vanes each comprising one blade and optionally one platform, said method comprising at least the following steps:
a) first layers of a reinforcement are wound on a mandrel, said mandrel also acting as a mold and comprising protruding portions, said first reinforcement layers comprising buttonholes positioned facing the protruding portions;
b) a prefabricated disc is positioned on each of the protruding portions;
c) last reinforcement layers are wound above the discs, thereby forming a preform;
d) a resin is injected into the closed mold with the preform and the resin-impregnated preform is polymerized;
e) the polymerized preform is taken out of the mold and the base of the blade, or optionally the platform of the vane if the latter comprises one of them, is added by welding on each of the discs.

According to particular embodiments of the invention, the method comprises at least one or a suitable combination of the following features:
- the prefabricated disc and the vane are made in a thermoplastic material;
- the prefabricated disc and the vane are made in a metal material;
- the disc comprises protrusions and/or asperities, said protrusions and asperities ensuring the anchoring of the disc in the preform;
- the vane and the disc comprise a reinforcement with long, medium or short fibers;
- in step e), the vane is added to the disc by thermoplastic welding;
- the resin is a thermosetting resin;
- the resin is polymerized at a temperature below the melting temperature of the disc;
- the thermosetting resin is an epoxy resin;
- the thermoplastic disc is made in PEEK, PEKK or PEI;
- the reinforcement comprises braids, fabrics or non-woven fabrics (NCF: Non-Crimp Fabrics);
- the protruding portions comprise spikes;
- in the event of breakage or damage of a vane, a new vane is added to the disc by welding;
- the weld is positioned on the inner face of the ferrule or outside the inner face of the ferrule.

The present invention also relates to a turbine-engine rectifier obtained by means of the method as described above.

SHORT DESCRIPTION OF THE DRAWINGS

FIGS. 1a and 1b, already mentioned, respectively illustrate a three-dimensional view and a sectional view of assembly examples between stator vanes and outer ferrule as in the state of the art (cf. caption).

Figure 1:
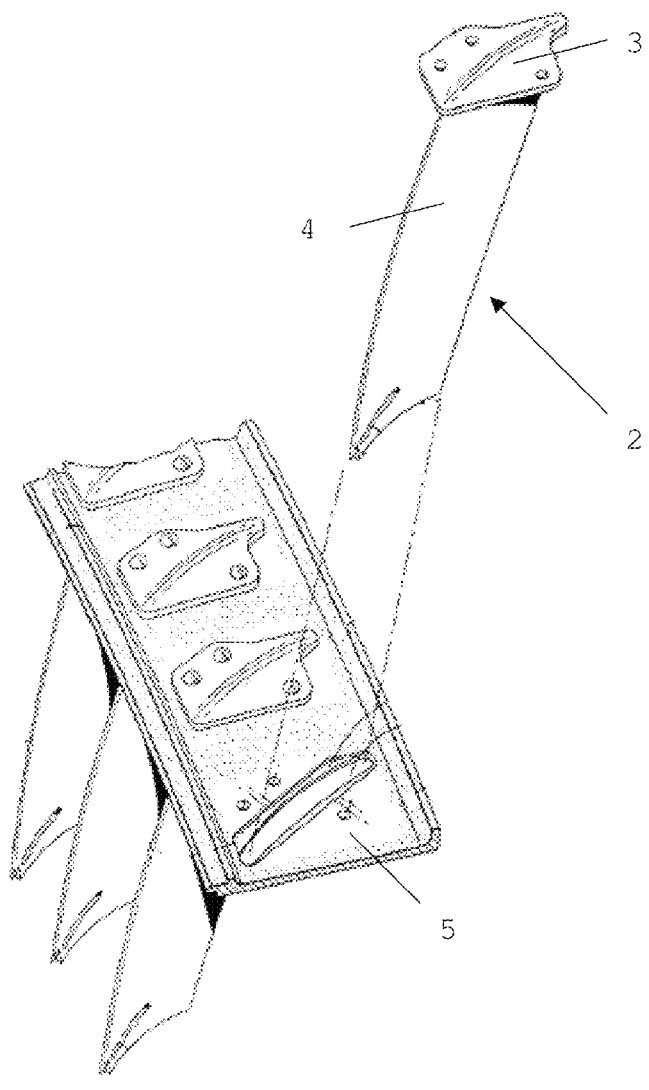
Figure 1:
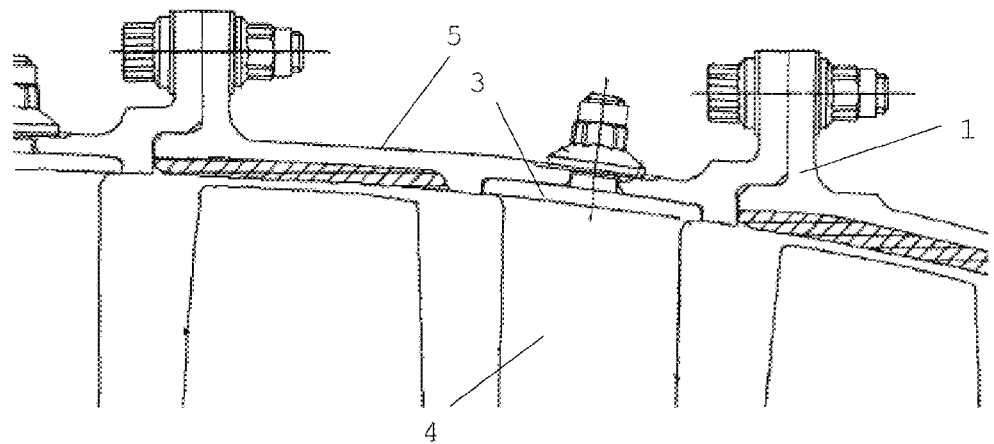

CAPTION (1) Assembly flange between outer ferrules
(2) Stator vane
(3) Platform of the vane
(4) Blade of the vane
(5) Outer ferrule
(6) First layers of the reinforcement of the preform of the ferrule
(7) Buttonhole on the first layers of the reinforcement of the preform of the ferrule (8) Last layers of the reinforcement of the preform of the ferrule
(9) Disc
(10) Protrusion of the disc
(11) Weld

DETAILED DESCRIPTION OF THE INVENTION

The present invention relates to a method for manufacturing a turbine-engine rectifier and, more particularly to a method for manufacturing a ferrule with integrated vanes as in a first embodiment of the invention or added vanes as in a second embodiment of the invention. The present invention is illustrated for the manufacturing of an outer ferrule but the method as in the invention also applies for manufacturing an inner ferrule.

Figure 2:
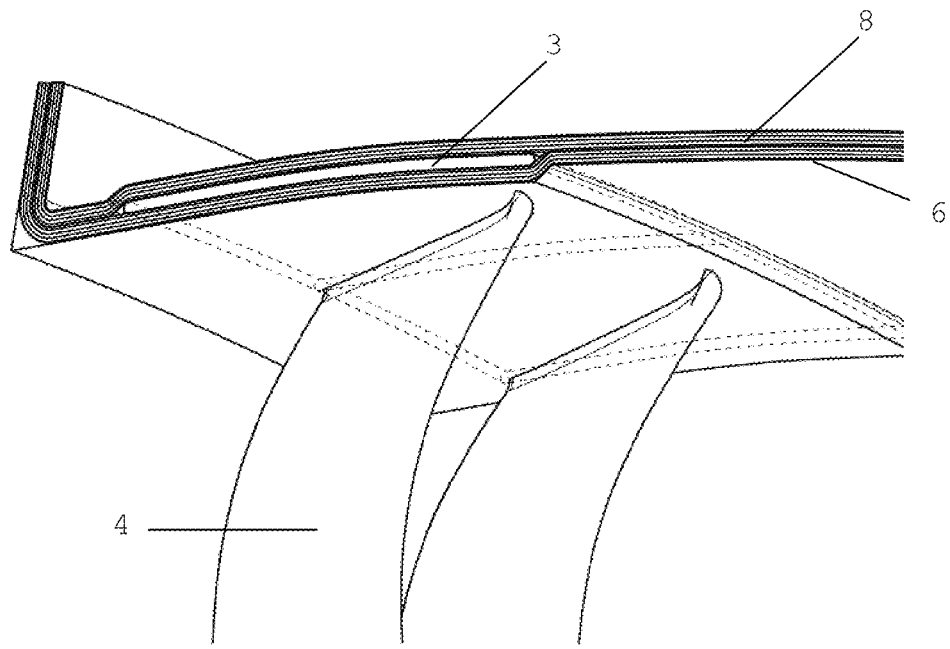
FIG. 2 illustrates a three-dimensional view of the stator vanes inserted between the reinforcement layers of the preform of the outer ferrule as in a first embodiment of the invention.
Figure 3:
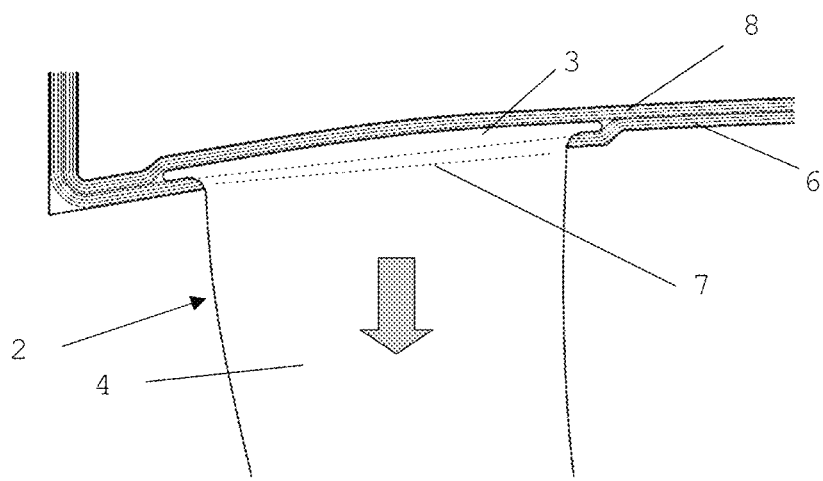
FIG. 3 illustrates a sectional view corresponding to the assembly of FIG. 2.

According to the first embodiment illustrated in FIGS. 2 and 3, the method comprises at least five steps. A first step a) consists in winding the first layers 6 of a reinforcement on a mandrel (not shown) also acting as a mold and comprising openwork. The first reinforcement layers 6 comprise buttonholes 7 positioned facing the openwork. In a second step b), the vanes 2, and more particularly the blades 4 of the vanes are inserted through the buttonholes 7 of the first layers 6 and the openwork of the mandrel in the direction of the arrow shown in FIG. 3. Preferentially, the vane 2 comprises a platform 3 with protrusions (not shown) used as mechanical anchoring. The surface of the platform may also comprise asperities (not shown) always with the goal of improving its anchoring. In a third step c), the last reinforcement layers 8 are wound above the vane platforms 3 in order to complete the preform of the rectifier. In a fourth step d), the mold is closed, a resin is injected around the vane platforms and the impregnated preform is polymerized. A fifth and last step e) consists in opening the mold and in removing from the mold the rectifier thereby obtained.

Figure 4:
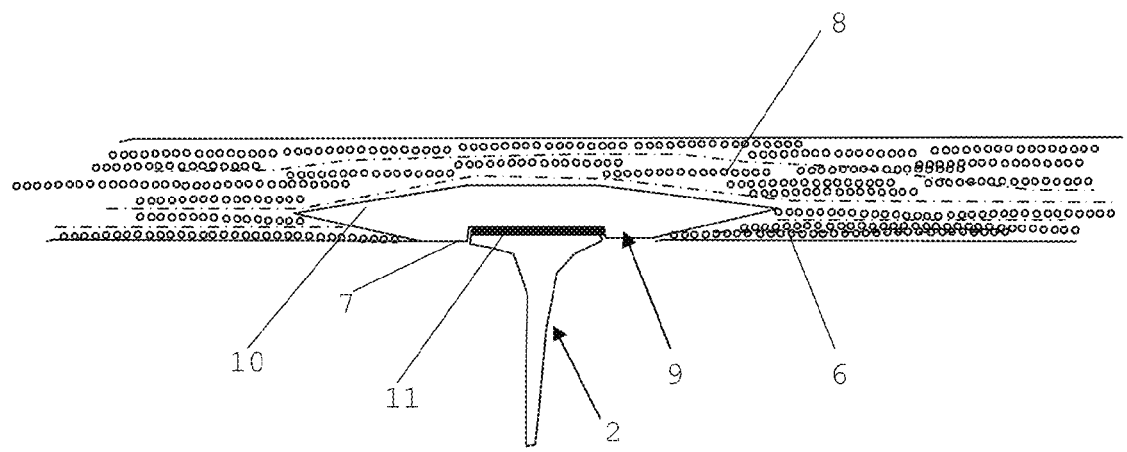
FIG. 4 illustrates a front view of a stator vane added to a disc inserted between the reinforcement layers of the preform of the outer ferrule as in a second embodiment of the invention.
Figure 5:
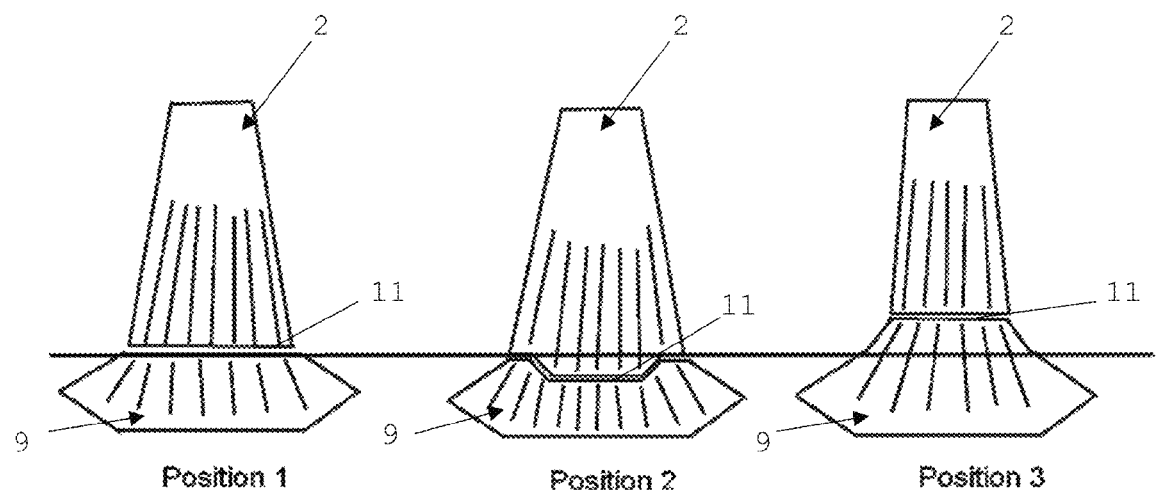
FIG. 5 illustrates a schematic view of three locations of the weld between the disc and the vane as in the second embodiment of the invention.

According to the second embodiment illustrated in FIG. 4, the method comprises at least 5 steps. A first step a) consists in winding the first layers of a reinforcement 6 on a mandrel (not shown) also acting as a mold and comprising no openwork but protruding portions, such as for example, spikes, radially positioned at the future location of the vanes. The first reinforcement layers 6 comprise buttonholes 7 positioned facing the protruding portions. In a second step b), prefabricated discs 9 are positioned on the protruding portions. There are as many discs as there are vanes to be attached to the ferrule. According to the present invention, the disc 9 comprises protrusions 10, i.e. extensions of the disc in axial and circumferential directions, these protrusions 10 lie on the first reinforcement layers 6. Alternatively, the disc comprises asperities (not shown) on its surface. According to still another alternative, the disc comprises protrusions as well as asperities on its surface. In a third step c), the last reinforcement layers 8 are wound above the discs 9 and their protrusions 10. In a fourth step d), the mold is closed, a resin is injected around the discs and the impregnated preform is polymerized. A fifth step e) consists in opening the mold and in adding by welding (11: weld) the vanes 2 onto the discs 9. The platform of the vane, if the latter comprises one of them, or the base of the vane blade, if the vane does not comprise any platform, is welded or consolidated together on the disc. The welding between the disc 9 and the vane 2 may be achieved in different positions as illustrated in FIG. 5. The weld 11 is advantageously positioned in position 2 or 3, i.e. outside the most mechanically-stressed area, namely the inner face of the ferrule (face in the aerodynamic vein).

According to both aforementioned embodiments of the invention, the injected resin is preferentially a thermosetting resin, for example an epoxy resin, appearing in the liquid form and reaching out to the contours and asperities of the platform or of the disc, thereby allowing proper anchoring of the latter. The polymerization of the resin is achieved at a temperature below the melting temperature of the vane or of the disc in order to avoid softening of the latter. The vanes as well as the discs may be made in a thermoplastic or metal material. The vanes and the discs are preferentially made in a thermoplastic material, and in the second embodiment, the vanes are added to the discs by thermoplastic welding. As an example, the vane and the disc are made in a PEEK (polyetheretherketone) resin, a PEKK (polyetheretherketoneketone) resin or PEI (polyetherimide) resin. The reinforcement of the ferrule may be braids, fabrics or non-woven fabrics (so-called NCF for Non-Crimp Fabrics). Similarly, the vane and the thermoplastic disc also comprise a reinforcement that may be with long, medium or short fibers.

Advantages of the Method as in the Invention

The assembling is simplified since it is not necessary to have attachment elements such as rivets, bolts, etc.

The connection between the vane (or the disc) and the ferrule is achieved in one single operation that is common with the manufacturing of the ferrule, which allows to increase the integration at the manufacturing level.

The method as in the invention allows to manufacture ferrules and vanes in composite material. The manufacturing of composite vanes and outer ferrules thereby generates a gain in mass by about 13% relative to a welded assembly between outer ferrules and vanes respectively made in titanium.

According to the second embodiment of the invention, in the event of breakage of a vane, a new vane may be easily added to the disc by thermoplastic welding.

Locating the weld in positions 2 and 3 as in the second embodiment allows to ensure the continuity of the fibers of the vane (position 2) or of the disc (position 3) in the most mechanically-stressed area.

The invention claimed is:

1. A method for manufacturing a turbine-engine composite rectifier comprising a ferrule provided with a plurality of stator vanes (2), said stator vanes each comprising a blade (4), said method comprising at least the following steps:
   a) first layers of a reinforcement (6) are wound on a mandrel, said mandrel also acting as a mold and comprising protruding portions, said first reinforcement layers (6) comprising buttonholes (7) positioned facing the protruding portions;
   b) a prefabricated disc (9) is positioned on each of the protruding portions;
   c) last reinforcement layers (8) are wound above the discs (9), thereby forming a preform;
   d) a resin is injected into the closed mold with the preform and the resin-impregnated preform is polymerized;
   e) the polymerized preform is taken out of the mold and at least one of the base of the blade (4) and a platform of the vane (3), if the latter comprises one of them, is added by welding on each of the discs (9).

2. The method as in claim 1, wherein the prefabricated disc (9) and the vane (2) are made in a thermoplastic material.

3. The method as in claim 2, wherein the vane (2) and the disc (9) comprise a reinforcement with long, medium or short fibers.

4. The method as in claim 2, wherein, in step e), the vane (2) is added to the disc (9) by thermoplastic welding.

5. The method as in claim 2, wherein the thermoplastic disc (9) is made in PEEK, PEKK or PEI.

6. The method as in claim 1, wherein the prefabricated disc (9) and the vane (2) are made in a metal material.

7. The method as in claim 1, wherein the disc (9) comprises protrusions (10, said protrusions ensuring the anchoring of the disc in the preform.

8. The method as in claim 7, wherein the disc (9) comprises asperities; said protrusions and asperities ensuring the anchoring of the disc in the preform.

9. The method as in claim 1, wherein the resin is a thermosetting resin.

10. The method as in claim 9, wherein the resin is polymerized at a temperature below the melting temperature of the disc (9).

11. The method as in claim 9, wherein the thermosetting resin is an epoxy resin.

12. The method as in claim 1, wherein the reinforcement (6,8) comprises braids, fabrics or non-woven fabrics (NCF: Non-Crimp Fabrics).

13. The method as in claim 1, wherein the protruding portions comprise spikes.

14. The method as in claim 1, wherein, in the event of breakage or damage of a vane (2), a new vane (2) is added to the disc (9) by welding.

15. The method as in claim 1, wherein the weld (11) is positioned on the inner face of the ferrule or outside the inner face of the ferrule.

16. The method of claim 1, said stator vanes comprising the platform.

17. The method of claim 1, wherein the polymerized preform is taken out of the mold and the base of the blade (4).

18. The method of claim 1, wherein the polymerized preform is taken out of the mold and the platform of the blade (3).

19. The method as in claim 1, wherein the disc (9) comprises asperities, said asperities ensuring the anchoring of the disc in the preform.

* * * * *